US009816834B2

(12) United States Patent
Duan et al.

(10) Patent No.: US 9,816,834 B2
(45) Date of Patent: Nov. 14, 2017

(54) GENERATING A QUERY INDEX AND QUERYING ON THE BASIS OF THE QUERY INDEX

(71) Applicant: International Business Machines Corporation, Armonk, NY (US)

(72) Inventors: Ning Duan, Beijing (CN); Peng Gao, Beijing (CN); Baohua Wang, Beijing (CN); Feng Juan Wang, Beijing (CN); Xin Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 14/807,923

(22) Filed: Jul. 24, 2015

(65) Prior Publication Data

US 2016/0033298 A1 Feb. 4, 2016

(30) Foreign Application Priority Data

Jul. 31, 2014 (CN) .......................... 2014 1 0375465

(51) Int. Cl.
*G01C 21/36* (2006.01)
*G01C 21/34* (2006.01)
*G08G 1/01* (2006.01)

(52) U.S. Cl.
CPC ..... *G01C 21/3691* (2013.01); *G01C 21/3415* (2013.01); *G08G 1/0112* (2013.01); *G08G 1/0125* (2013.01); *G08G 1/0133* (2013.01)

(58) Field of Classification Search
CPC ............ G01C 21/3691; G01C 21/3415; G08G 1/0133; G08G 1/0112; G08G 1/0125
See application file for complete search history.

(56) References Cited

U.S. PATENT DOCUMENTS

| 6,587,781 B2 * | 7/2003 | Feldman | G08G 1/0104 340/909 |
| 8,275,402 B2 * | 9/2012 | Talty | H04L 12/189 340/425.5 |
| 8,471,701 B2 | 6/2013 | Yariv et al. | |
| 8,531,293 B2 | 9/2013 | Putz | |
| 8,762,035 B2 * | 6/2014 | Levine | G01C 21/3492 340/988 |
| 9,349,285 B1 * | 5/2016 | Fowe | G08G 1/00 |

(Continued)

OTHER PUBLICATIONS

Nait-Sidi-Moh et al., "On the Use of Location-Based Services and Geofencing Concepts for Safety and Road Transport Efficiency," Trends in Mobile Web Information Systems, Communications in Computer and Information Science, vol. 183, pp. 135-144, 2013, © Springer International Publishing Switzerland 2013.

(Continued)

*Primary Examiner* — Thomas Ingram
(74) *Attorney, Agent, or Firm* — Nicholas D. Bowman

(57) ABSTRACT

A road segment set influenced by an event on the basis of a connected network is identified. The connected network is built on the basis of reachability of a road segment in the road network. Furthermore, each road segment in the road segment set is reachable via the road network from the location of the event, or, in the alternative, the location of the event is reachable via the road network from each road segment in the road segment set. A query index is generated on the basis of the event and the road segment set.

11 Claims, 8 Drawing Sheets

(56) References Cited

U.S. PATENT DOCUMENTS

| | | | |
|---|---|---|---|
| 2002/0026278 A1* | 2/2002 | Feldman | G08G 1/0104 701/117 |
| 2005/0159883 A1 | 7/2005 | Humphries et al. | |
| 2006/0158330 A1* | 7/2006 | Gueziec | G01C 21/3492 340/539.13 |
| 2009/0140886 A1 | 6/2009 | Bender | |
| 2009/0243925 A1 | 10/2009 | Kellermeier et al. | |
| 2009/0287401 A1* | 11/2009 | Levine | G01C 21/3492 701/117 |
| 2011/0043377 A1* | 2/2011 | McGrath | G08G 1/09675 340/905 |
| 2012/0086583 A1* | 4/2012 | Morrison | G08G 1/0141 340/905 |
| 2012/0239281 A1* | 9/2012 | Hinz | G01C 21/32 701/117 |
| 2013/0324160 A1 | 12/2013 | Sabatellil et al. | |
| 2014/0062790 A1* | 3/2014 | Letz | H04L 67/1095 342/386 |
| 2014/0114556 A1* | 4/2014 | Pan | G08G 1/00 701/119 |
| 2014/0278074 A1* | 9/2014 | Annapureddy | G01C 21/3453 701/468 |
| 2015/0160023 A1* | 6/2015 | Goel | G08G 1/0112 701/400 |
| 2016/0216125 A1* | 7/2016 | Ahn | G06Q 50/30 |
| 2016/0223343 A1* | 8/2016 | Averbuch | B60W 50/14 |
| 2016/0247397 A1* | 8/2016 | Xu | G08G 1/0125 |
| 2016/0334241 A1* | 11/2016 | Kesting | G01C 21/32 |

OTHER PUBLICATIONS

CN Application 201410375465.5, Entitled "Generating a Query Index and Querying on the Basis of the Query Index," Filed Jul. 31, 2014, 39 pages.

Mell et al., "The NIST Definition of Cloud Computing," National Institute of Standards and Technology, U.S. Department of Commerce, Special Publication 800-145, Sep. 2011, 7 pages.

IBM, "Connected Car," m2m demos @ IBM, Connected Car demos, 6 pages, http://m2m.demos.ibm.com/connectedCar.html.

* cited by examiner

GENERATING A QUERY INDEX AND QUERYING ON THE BASIS OF THE QUERY INDEX

CROSS-REFERENCE TO RELATED APPLICATION

This application is related to and claims the benefit of Chinese Patent Application No. 201410375465.5, filed Jul. 31, 2014, which application is incorporated by reference herein for all purposes.

BACKGROUND

Various embodiments of the present disclosure relate to road-network management, and more specifically, to generating a query index and querying on the basis of the query index in road-network management.

With the development of computer technology, monitoring technology, and communication technology, the technology of connected vehicles has become more popular. So far, status information about a road network and vehicles can be monitored by various monitoring devices, and, moreover, collected information can be analyzed and processed for effective management of vehicle running statuses and provisioning of comprehensive services.

For example, the locations and travel speeds of vehicles in the road network can be monitored in real time. From this monitoring, information can be gleaned about delay events (e.g., traffic accidents, congestion, road construction, etc.) that are occurring in road segments within the road network. This event information can be broadcast to vehicles that are travelling on roads near (e.g., within a predefined radius of) a particular event's location.

SUMMARY

In some embodiments of the present invention, there is provided a method for generating a query index with respect to an event in a road network. As part of the method, a road segment set influenced by the event on the basis of a connected network is identified. The connected network is built on the basis of reachability of a road segment in the road network. Furthermore, each road segment in the road segment set is reachable via the road network from the location of the event. As further part of the method, the query index is generated on the basis of the event and the road segment set.

In some embodiments of the present invention, there is provided an apparatus for generating a query index with respect to an event in a road network. The apparatus includes an identifying module. The identifying module is configured to identify a road segment set influenced by the event on the basis of a connected network. The connected network is built on the basis of reachability of a road segment in the road network. Furthermore, each road segment in the road segment set is reachable via the road network from the location of the event. The apparatus also includes a generating module. The generating module is configured to generate the query index on the basis of the event and the road segment set.

In some embodiments of the present invention, there is provided a method for generating a query index with respect to an event in a road network. As part of the method, a road segment set influenced by the event on the basis of a connected network is identified. The connected network is built on the basis of reachability of a road segment in the road network. Furthermore, the location of the event is reachable via the road network from each road segment in the road segment set. As further part of the method, the query index is generated on the basis of the event and the road segment set.

BRIEF DESCRIPTION OF THE DRAWINGS

Through the more detailed description of some embodiments of the present disclosure in the accompanying drawings, the above and other objects, features, and advantages of the present disclosure will become more apparent, wherein the same reference generally refers to the same components in the embodiments of the present disclosure.

DETAILED DESCRIPTION

Figure 1:
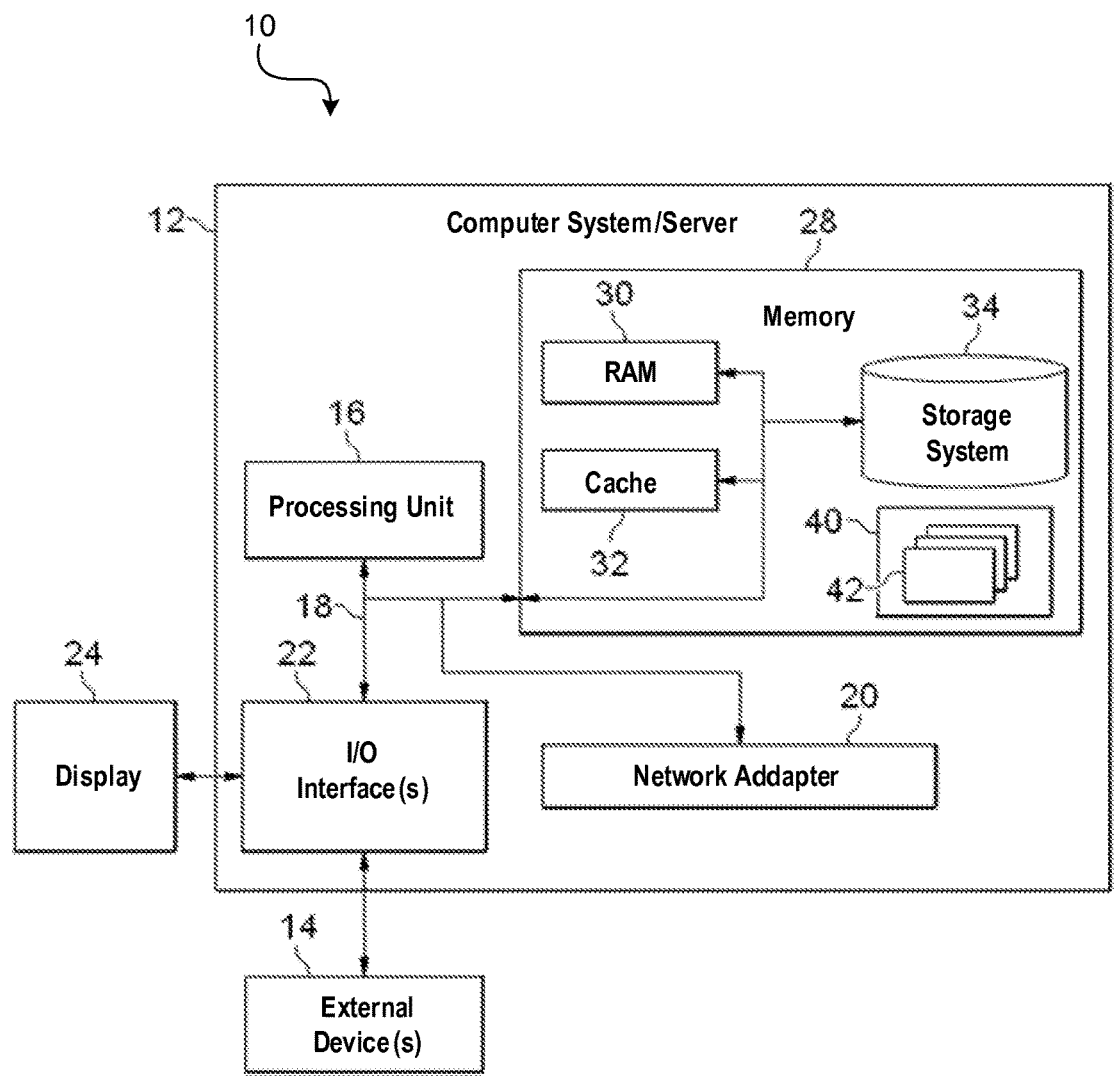
FIG. 1 schematically depicts an exemplary computer system/server which is applicable to implement embodiments of the present invention.

Some embodiments will be described in more detail with reference to the accompanying drawings, in which embodiments of the present disclosure have been illustrated. However, the present disclosure can be implemented in various manners, and thus should not be construed to be limited to the embodiments disclosed herein. On the contrary, those embodiments are provided for enabling thorough and complete understanding of the present disclosure, and for conveying the scope of the present disclosure to those skilled in the art.

It is understood in advance that although this disclosure includes a detailed description on cloud computing, implementation of technical solutions recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, an example of a cloud computing node is shown. Cloud computing node 10 shown in FIG. 1 is only one example of a suitable cloud computing node and is not intended to suggest any limitation as to the scope of use or functionality of embodiments of the invention described herein. Regardless, the cloud computing node 10 is capable of being used to implement and/or perform any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
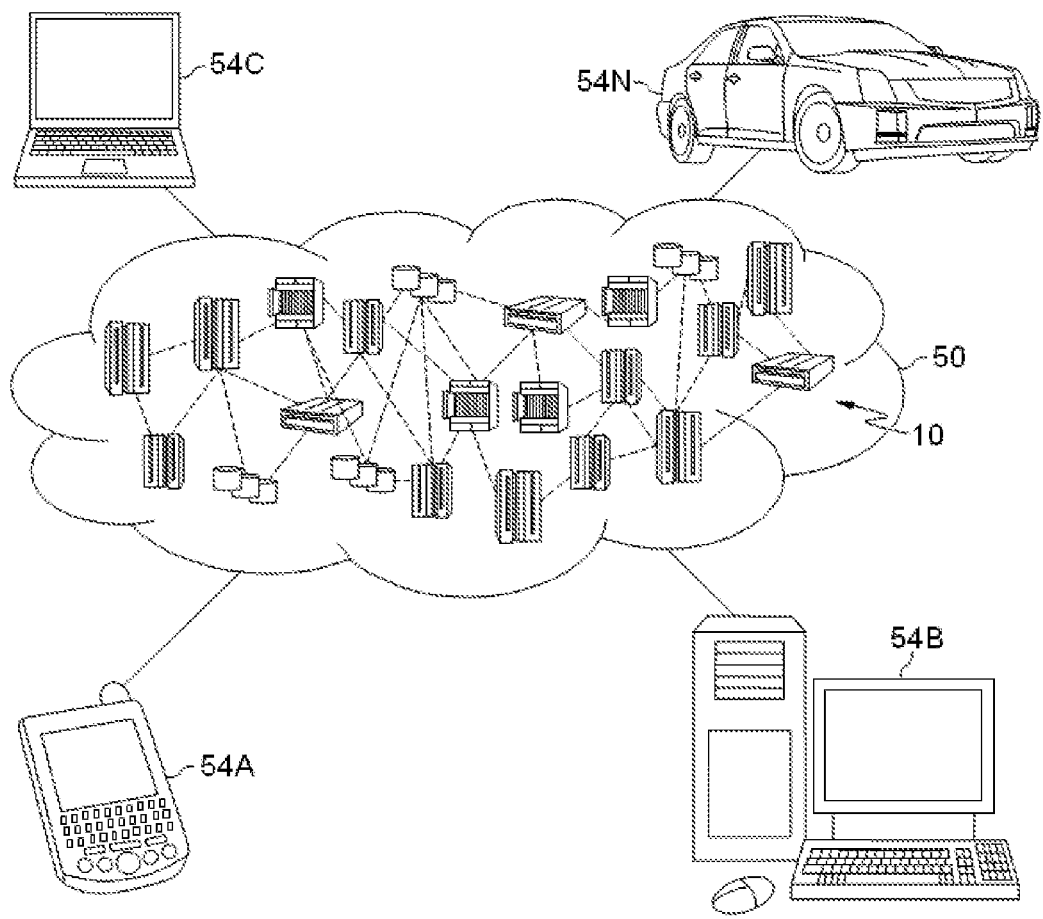
FIG. 2 schematically depicts an exemplary cloud computing environment, in accordance with embodiments.

Referring now to FIG. 2, an exemplary cloud computing environment 50 is depicted. As shown, cloud computing environment 50 comprises one or more cloud computing nodes 10 with which local computing devices used by cloud consumers may communicate. The local computing devices may be, for example, personal digital assistant (PDA) or cellular telephone 54A, desktop computer 54B, laptop computer 54C, and/or automobile computer system 54N. The cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
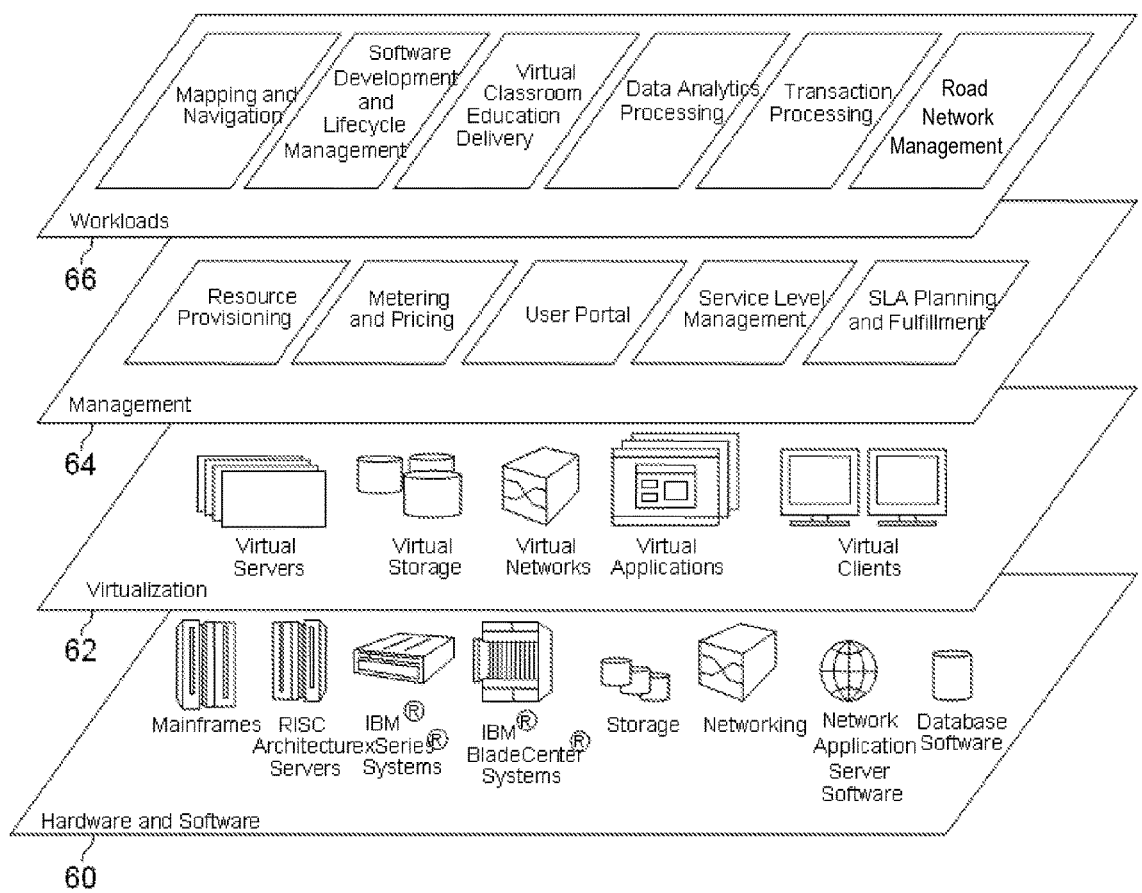
FIG. 3 schematically depicts a set of functional abstraction layers provided by the cloud computing environment of FIG. 2, in accordance with embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes (e.g. IBM® zSeries® systems); RISC (Reduced Instruction Set Computer) architecture based servers (e.g., IBM pSeries® systems); IBM xSeries® systems; IBM BladeCenter® systems; storage devices; networks and networking components. Examples of software components include network application server software (e.g., IBM WebSphere® application server software); and database software (e.g, IBM DB2® database software). (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers, virtual storage, virtual networks including virtual private networks, virtual applications and operating systems, and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and road-network management.

In some embodiments of the present invention, the technical solution for road-network management according to various embodiments of the present invention can be implemented at workloads layer 66, so as to generate a query index with respect to an event in the road network in the cloud computing environment and to query, on the basis of the generated query index, which event(s) will influence a road segment on which a vehicle is moving. The application environment of the present invention has been illustrated above, and those skilled in the art should understand various embodiments of the present invention can further be implemented in any other type of computing environment that is known currently or to be developed later.

A concept of geo-fencing has been proposed in the field of connected vehicles. Geo-fencing technology involves location-based services (LBS), and the technology can be used to define a set of virtual geographic boundaries. When a vehicle enters, leaves, or moves within the virtual geographic boundaries, services, such as notifications, can be provided to the vehicle. In the context of embodiments of the present invention, a road segment refers to a road between two intersections in a road network.

However, in some situations, existing geo-fencing technical solutions are implemented on the basis of broadcast technologies. Such a broadcast will cover all vehicles within the predefined radius but cannot limit the sending of a message only to vehicles that are on a road segment where an accident has occurred. Since there is a large amount of vehicles travelling in the road network, and because events like traffic accidents and/or traffic jams might frequently occur in a heavily-trafficked road segment, running vehicles within the predefined radius will continuously receive various broadcasts.

On the one hand, a vehicle driver has to judge whether broadcast content is relevant to himself or herself, so the driver cannot focus on driving; on the other hand, broadcasts will occupy additional communication resources, which decreases the communication efficiency of connected vehicles. Therefore, improving query indexes in the existing geo-fencing technology is significant.

According to embodiments, therefore, it is desired to define geo-fencing more accurately and effectively. Specifically, in a concrete application environment of notifying a vehicle of an event in a road network, it is desired to generate a query index with respect to road segments that might be influenced by the event. Further, it is desired to send a notification to a vehicle travelling on an influenced road segment on the basis of the generated query index.

Figure 4:
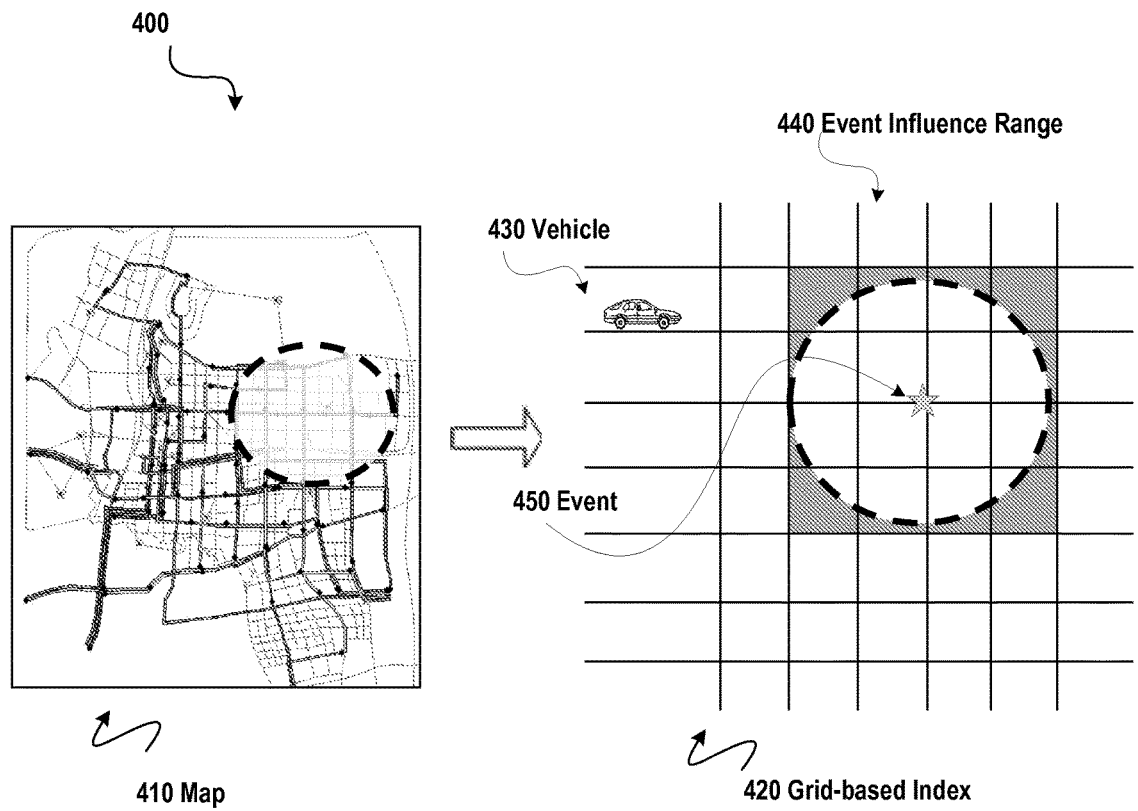
FIG. 4 schematically depicts a block diagram of a technical solution for generating a query index according to one technical solution.

FIG. 4 schematically shows a block diagram 400 of a technical solution for creating a query index according to one technical solution, in accordance with some embodiments. In the technical solution as shown in FIG. 4, a map 410 schematically shows a road network, and an index 420 is a grid-based index. There is a vehicle 430 traveling within the road network. The grid can divide road segments in the road network on the basis of a predefined distance (e.g., 500 m, etc.). For example, when an event 450 occurs in a given grid, an event influence range 440 can be defined in a predefined radius around the location of event 450, at which point a query index can be built on the basis of an identifier of a grid within the event influence range.

Although embodiments of the technical solution shown in FIG. 4 can notify all vehicles within the entire influence range, the notification via broadcast can be inaccurate. For example, suppose an event occurs in an east-to-west lane of a highway. If the grid technology only considers the spatial linear distance between a vehicle and the event's location without considering the vehicle's driving direction and traffic information of the road network, vehicles moving in the opposite direction (e.g., from west to east) or on nearby overpasses will also receive a notification of the event. Since vehicles moving in the opposite direction or on nearby overpasses can hardly reach the event's location within the event duration, targets of the broadcast notification can be deemed not accurate, and the notification can cause interference to a massive number irrelevant vehicles.

In view of these drawbacks of some technical solutions, various embodiments of the present invention include a method for generating a query index with respect to an event in a road network. Embodiments include identifying a road segment set influenced by the event on the basis of a connected network, wherein the connected network is built on the basis of reachability of road segments in the road network, and each road segment in the road segment set is reachable via the road network from the location of the event. Embodiments further include generating the query index on the basis of the event and the road segment set.

In addition, embodiments of the present invention further include a method for notifying a vehicle travelling in a road network. Embodiments include, in response to determining that a road segment on which the vehicle travels is any road segment in a road segment set associated with a query index, notifying the vehicle of an event associated with the any road segment in the query index, wherein the query index is generated by a method according to embodiments of the present invention.

In the embodiments of the present invention, reachability of road segments is taken into consideration, and when an event occurs in the road network, a query index can be built on the basis of the reachability with respect to road segments that can reach the location of the event. Thereby, consideration is not be given to road segments that cannot reach the event location (e.g., road segments in the opposite direction, road segment on overpasses, etc.), and further a more accurate query index is generated. Moreover, notification can be given on the basis of the generated query index, thereby reducing interference to vehicles that are moving on irrelevant road segments.

Figure 5:
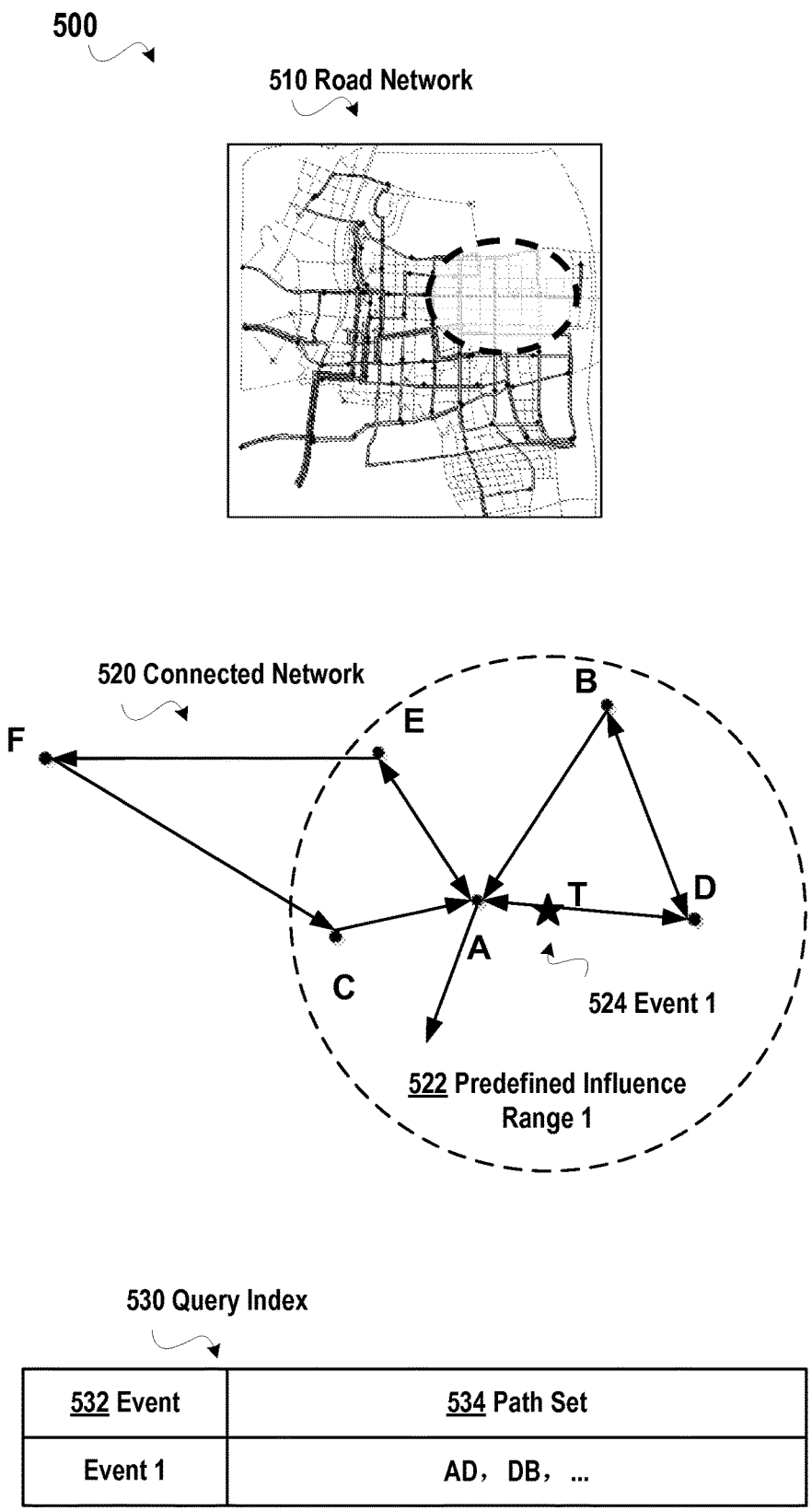
FIG. 5 schematically depicts a block diagram of a technical solution for generating a query index with respect to an event in a road network according to some embodiments of the present invention.

FIG. 5 schematically shows a block diagram 500 of a technical solution for generating a query index with respect to an event in a road network according to some embodiments of the present invention. As shown in FIG. 5, a connected network 520 can be built on the basis of reachability of road segments in a road network 510. It is appreciated that, in the embodiments of the present invention, reachability in the road network should be considered. For example, consideration should be given to permitted driving directions on a road segment, whether the road segment is a common road or an overpass, etc. In this manner, connected network 520 can be built, and arrows of various edges in connected network 520 represent directions of reachability.

It is appreciated that, connected network 520 shown in FIG. 5 schematically shows only one part of the road network, and those skilled in the art can build a connected network of the entire road network on the basis of principles of the present invention. When an event 1 524 occurs at a location T, road segments satisfying reachability with respect to the location T of event 1 524 can be identified within the predefined influence range (e.g., a range with a radius of 2 km) around the location T of event 1 524. Since event 1 524 influences only these road segments satisfying reachability, a query index 530 can be generated on the basis of event 1 524 and the reachable road segment set. In some embodiments of the present invention, a query index includes an event 532 and a road segment set (path set) 534. Specifically, road segment set 534 can include road segments AD, DB, etc. It is appreciated that, although the example in FIG. 5 shows the predefined influence range 1 522 by a circle having a radius of 2 km, the predefined influence range 522 can be in an irregular shape when the range is determined, for example, on the basis of the location of an event and a travel distance between road segments in the road network. Hereinafter, detailed description is presented on how to determine the predefined influence range, in accordance with embodiments.

In a further embodiment, suppose a given vehicle is running on the road segment DB. At this point, it can be found on the basis of query index 530 that the road segment DB will be influenced by event 1 524, so the given vehicle is notified about event 1 524.

Figure 6:
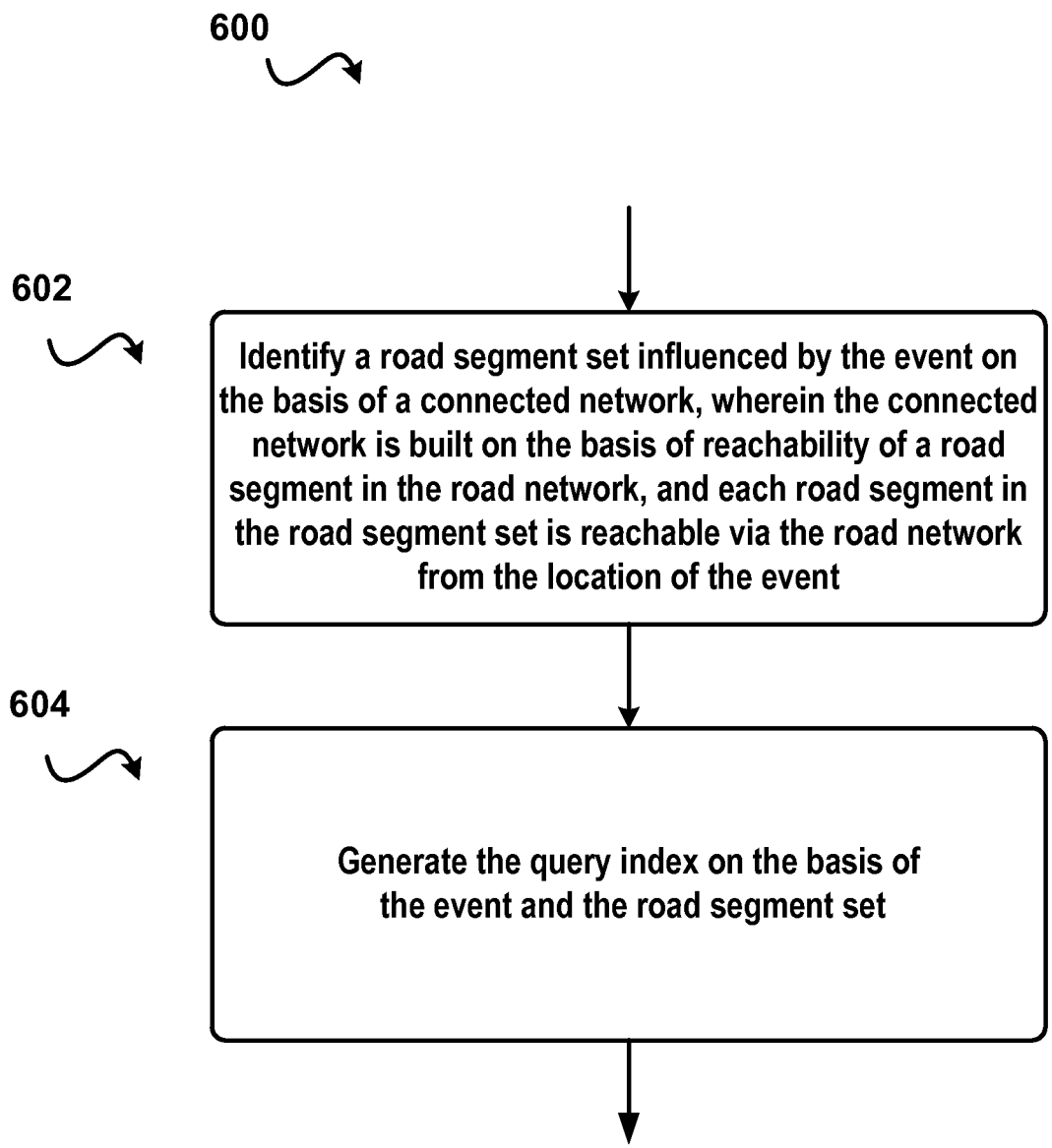
FIG. 6 schematically depicts a flowchart of a method for generating a query index with respect to an event in a road network according to some embodiments of the present invention.

Hereinafter, detailed description is presented on how to generate a query index with reference to the accompanying drawings, in accordance with embodiments. FIG. 6 schematically shows a flowchart 600 of a method for generating a query index with respect to an event in a road network according to some embodiments of the present invention. Specifically, in step 602 a road segment set influenced by the event is identified on the basis of a connected network, wherein the connected network is built on the basis of reachability of road segments in the road network, and each road segment in the road segment set is reachable via the road network from the location of the event.

In this embodiment, the connected network is built on the basis of reachability of road segments in the road network. For example, a connected network describing reachability of road segments in the road network can be built on the basis of the road network in a pre-processing step. In this embodiment, reachability is described by the direction of an edge in the connected network. For example, an edge between points A and D has a two-way arrow, which indicates road segments AD and DA are two opposite road segments. An edge between points A and B has a one-way arrow, which indicates the road segment between the two points is a one-way road.

Since the event only influences road segments near the event but will not influence traffic conditions in the entire road network, in some embodiments of the present invention, those skilled in the art can define a predefined influence range of the event. Although the example in FIG. 5 shows the predefined influence range by a circle, those skilled in the art can further define the range in a rectangle, a square, an ellipse, or other irregular shape on the basis of topology of urban roads. For another example, when the road network is expressways, a strip influence range can be defined.

In step 604, a query index is generated on the basis of the event and the road segment set. In this embodiment, the index can include the event and a set of road segments influenced by the event. In some embodiments of the present invention, the query index can be represented with a data structure as shown in Table 1 below.

TABLE 1

Example of Query Index

| Event | Road Segment Set |
|---|---|
| event 1 | AD, DB, . . . |

In some embodiments of the present invention, connection relationships of the connected network are set on the basis of topology of the road network, and reachability in the connected network is set on the basis of traffic information of the road network.

Connection relationships of the connected network can be obtained from topology of the road network, and road relationships can represent connection relationships of various locations and between various locations. It is appreciated that, in this embodiment, connection relationships only refer to physical connection relationships and do not include information associated with traffic rules (e.g., do not include direction information like information about whether a particular road is a one-way road or a two-way road). In addition, reachability can be set on the basis of traffic information of the road network, at which point consideration is given to whether each location is reachable via the road network. For example, points A and D in FIG. 5 contain a two-way road segment, so they can be connected by a two-way edge.

In some embodiments of the present invention, the setting connection relationships of the connected network on the basis of topology of the road network includes using a node in the connected network to represent an intersection in the road network and further includes using an edge in the connected network to represent a road segment in the road network.

Specifically, those skilled in the art can define various data structures to represent the connected network. For example, the connected network can be represented as Table 2 below. It is appreciated that, Table 2 is only illustrative, and those skilled in the art could further represent the connected network in other manner.

TABLE 2

Example of Connected Network

| No. | Node | Edge |
|---|---|---|
| 1 | C | CA |
| 2 | B | BA |
| 3 | D | DA |
| . . . | . . . | . . . |

In some embodiments of the present invention, reachability in the connected network is represented by determining a direction of an edge in the connected network to represent the reachability on the basis of an allowed travel direction of the road segment. In this embodiment, the reachability can be represented according to a direction opposite to the allowed direction, so as to make it easy to determine which road segment in the road network can be reached from the location of the event.

By definition of the direction above, when determining which road segment(s) will be influenced by the event, it can be determined which road segments can be reached along a defined direction from the location of the event. At this point, road segments reached on the basis of the connected network are those road segments which will be influenced by the event. Those skilled in the art should understand although the above example defines the direction of an edge between connected road segments by a direction opposite to the allowed direction, those skilled in the art can further define the direction of the edge on the basis of a same direction as the allowed travel direction.

It is appreciated that, although a method for generating a query index with respect to an event in a road network has been shown above on the basis of a connected network obtained in a pre-processing step, the connected network can be directly built on the basis of the road network and further based on a query index generated in the embodiments of the present invention.

Specifically, in some embodiments of the present invention, there is a method for generating a query index with respect to an event in a road network. This method includes building, on the basis of the road network, a connected network that describes reachability of road segments in the road network. This method further includes identifying, on the basis of the connected network, a road segment set influenced by the event, wherein each road segment in the road segment set is reachable via the road network from a location of the event. And, this method further includes generating the query index on the basis of the event and the road segment set.

In some embodiments of the present invention, the building, on the basis of the road network, a connected network that describes reachability of road segments in the road network includes setting connection relationships of the connected network on the basis of topology of the road network and further includes setting reachability in the connected network on the basis of traffic information for the road network.

In some embodiments of the present invention, setting reachability in the connected network on the basis of traffic information of the road network includes determining a direction of an edge in the connected network to represent the reachability on the basis of an allowed travel direction of the road segment.

In some embodiments of the present invention, each of the road segments is within a predefined influence range around the location of the event, and the predefined influence range is determined on the basis of at least one of: a physical distance from the location of the event to the road segment; a travel distance from the location of the event to the road segment along road segments in the road network; the type of the event; and the severity of the event.

Specifically, in some embodiments of the present invention, the physical distance from the location of the event to the road segment can be measured in various manners. For example, a linear distance from the location of the event to a nearer intersection, a farther intersection, or a central position of the road segment can act as the physical distance.

In some embodiments of the present invention, the predefined influence range can be determined on the basis of a travel distance along road segments in the road network. During actual travel, since the vehicle has to travel along roads in the road network and cannot travel somewhere without roads, the predefined range calculated as such can accurately reflect the possibility that the vehicle reaches the location of the event along real roads in the road network, and further helps to determine road segments that might be influenced by the event.

In some embodiments of the present invention, event types could include, for example, traffic accident, congestion, road repair, etc. The predefined influence range can be determined on the basis of the influence of different event types. For example, an influence range of 2 km could be set for a traffic accident, an influence range of 1 km could be set for congestion.

In some embodiments of the present invention, severity of the event can further be considered. For example, suppose a serious traffic accident occurs on an expressway; at this point the influence range could be set as 20 km, for example, to notify vehicles along the expressway to detour as soon as possible. Or when a slight traffic accident occurs on an ordinary road in a city, the influence range could be set as 2 km, for example.

Alternatively, in embodiments, at least two of the above respects can further be combined. For example, weights can be assigned to the physical distance, the travel distance, the type of the event, and the severity of the event, respectively, so as to calculate a final predefined influence range.

In some embodiments of the present invention, identifying the road segment set influenced by the event on the basis of a connected network includes forming the road segment set by identifying each reachable road segment within the predefined influence range of an edge representing a road segment to which the location of the event belongs.

Figure 7:
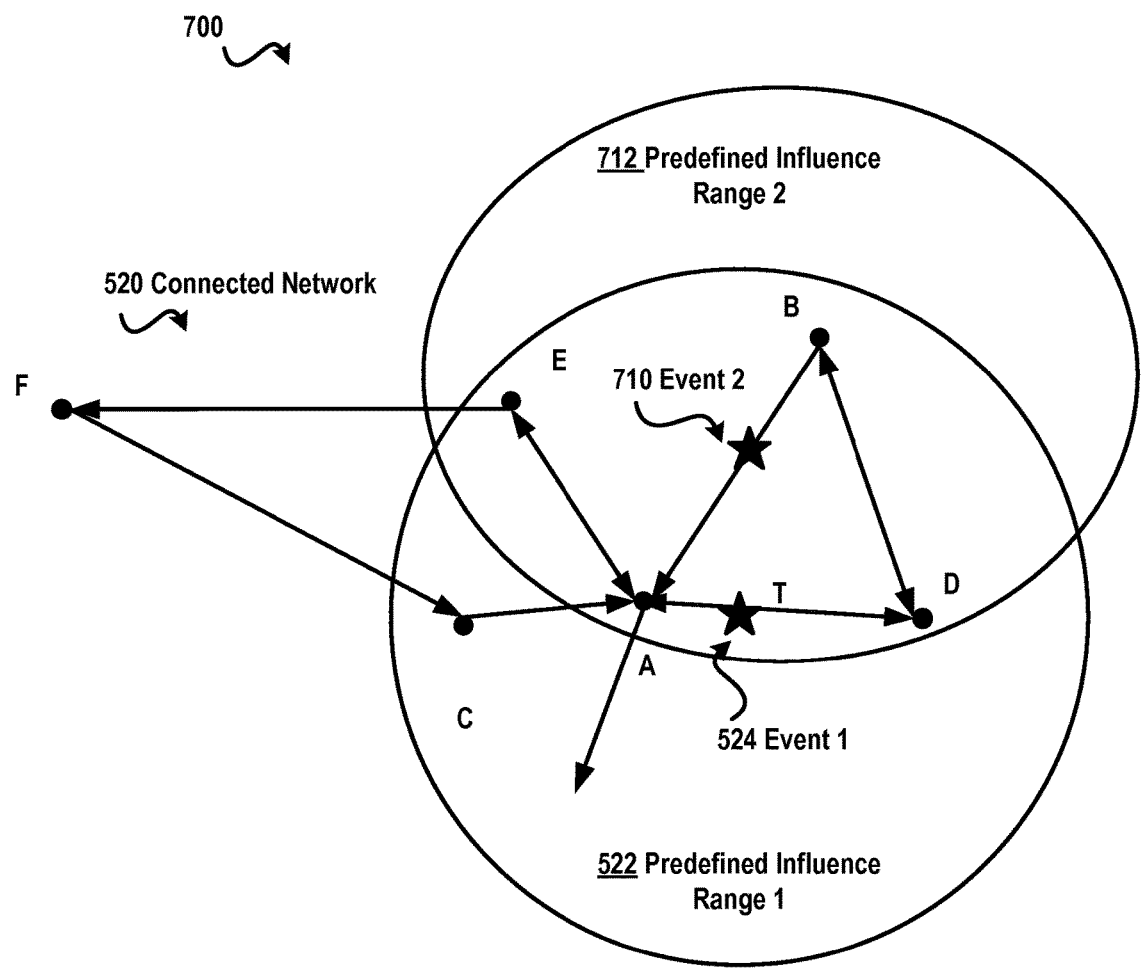
FIG. 7 schematically depicts a block diagram of a technical solution for generating a query index with respect to a plurality of events in a road network according to some embodiments of the present invention.

With reference to FIG. 7 now, description is presented on how to determine the road segment set, in accordance with embodiments. FIG. 7 schematically shows a block diagram 700 of a technical solution for generating a query index with respect to multiple events in a road network according to some embodiments of the present invention. Connected network 520, event 1 524 and predefined influence range 1 522 shown in FIG. 7 are substantially the same as those shown in FIG. 5. Now, description is presented on how to determine a road segment set that will be influenced by event 1 524, in accordance with embodiments.

Suppose event 1 524 at the location T is a serious traffic accident and influences road segments in two directions (road segments AD and DA), then at this point road segments that might be influenced by event 1 524 can be looked up along two directions.

Within a predefined influence range 1 522, from the location T, event 1 524 will influence road segment AD along the direction shown by arrow A→D; event 1 524 will influence road segment DB along the direction shown by arrow D→B; event 1 524 will influence road segment BA along the direction shown by arrow B→A; event 1 524 will influence road segment AE along the direction shown by arrow A→E. In this manner, by traversing the entire connected network along one direction from the location T, a road segment set 1={AD, DB, BA, AE} can be obtained.

Since event 1 524 will influence road segments in two directions, it is further necessary to determine reachable road segments along the direction shown by arrow D→A from the location T within predefined influence range 1 522. Specifically, along the direction shown by arrow D→A, event 1 524 will influence road segment DA; along the direction shown by arrow A→E, event 1 524 will influence road segment AE. At this point, by traversing the entire connected network along the other direction, a road segment set 2={DA, AE} can be obtained.

Therefore, a road segment set 3 associated with event 1 524 is road segment set 1+road segment set 2={AD, DB, BA, DA, AE}. For example, a query index associated with event 1 524 can be represented as Table 3 below.

TABLE 3

Example of Query Index

| Event | Road Segment Set |
|---|---|
| event 1 | AD, DB, BA, DA, AE |

In addition, FIG. 7 further schematically shows an event 2 710 occurring on road segment BA, and a predefined influence range 2 712 of event 2 710 is shown by an ellipse in FIG. 7. Those skilled in the art can build a query index associated with event 2 710 on the basis of the principle described above, for example, as shown in Table 4 below.

TABLE 4

Example of Query Index

| Event | Road Segment Set |
|---|---|
| event 2 | BA, AD, DB, AE |

Some embodiments of the present invention further include, in response to a second predefined influence range around a location of a second event in the road network overlapping the predefined influence range, identifying within an overlap range a second road segment set influenced by the second event on the basis of the connected network, wherein each road segment in the second road segment set is reachable via the road network from the location of the second event; and updating the query index on the basis of the second event and the second road segment set.

Continuing the above example, when multiple events occur in the road network, each event can be associated with a road segment set which the event might influence. For example, regarding the circumstance where two events occur as shown in FIG. 7, a query index can be generated as shown in Table 5 below.

TABLE 5

Example of Query Index

| Event | Road Segment Set |
|---|---|
| event 1 | AD, DB, BA, DA, AE |
| event 2 | BA, AD, DB, AE |

It is appreciated that, Table 3 to Table 5 are merely illustrate examples of the data structure of the query index, and those skilled in the art can further use other data structures to represent the query index. For example, the query index can be constructed by taking each road segment in the road segment set as a keyword, at which point the query index shown in Table 5 can further be represented as shown in Table 6.

TABLE 6

Example of Query Index

| Road Segment | Event |
|---|---|
| AD | event 1, event 2 |
| DB | event 1, event 2 |
| BA | event 1, event 2 |
| DA | event 1 |
| AE | event 1, event 2 |

The above example merely illustrates a circumstance where the query index includes an event and road segments influenced by the event. In some embodiments of the present invention, the index can further include one or more other parameters, such as a distance between a road segment and a location of an event, etc. Specifically, the query index can further adopt a pattern shown in Table 7 below.

TABLE 7

Query Index for Event 1

| Node | Distance | Road Segment |
|---|---|---|
| A | 1.78 km | TA |
| B | 6.9 km | DT BD |
| ... | ... | ... |

Some embodiments of the present invention include a method for notifying a vehicle travelling in a road network. This method includes, in response to determining that a road segment on which the vehicle is travelling is any road segment in a road segment set associated with a query index, notifying the vehicle of an event associated with a road segment in the query index, wherein the query index is generated by a method according to the present invention.

In this embodiment, a road segment where the vehicle is travelling can be determined by detecting a location of the vehicle. For example, the location of the vehicle can be measured by vehicle GPS. Since there might be an offset between the measured location and a real location, the offset can be corrected on the basis of road network information so as to determine on which road the vehicle is travelling.

For example, when it is found that the vehicle is travelling on road segment AD, it can be determined, on the basis of the exemplary query index shown in Table 5 above, by which event(s) the road segment might be influenced. For example, a road segment set corresponding to event 1 includes road segment AD, so the vehicle will be influenced by event 1. For another example, a road segment set corresponding to event 2 also includes road segment AD, so the vehicle will further be influenced by event 2. Therefore, the vehicle is notified about events 1 and 2.

For another example, when making a query on the basis of the query index as shown in Table 6, if road segment is taken as the keyword, it can be directly determined road segment AD will be influenced by events 1 and 2, so the vehicle is notified of events 1 and 2.

Some embodiments of the present invention include determining, on the basis of status information of a road network, travel time for the vehicle to reach the location of the event. The embodiment further includes, in response to the travel time being less than predicted duration of the event, notifying the vehicle of the event.

When events like traffic accidents occur in the road network, policemen or other rescuers will handle these accidents and clear roads as soon as possible, so each event will end in a given duration. In this embodiment, possible duration of the event can be predicted, and travel time for the vehicle to reach the accident spot from a current location can be estimated. Then, by comparing the duration with the travel time, it can be determined whether the vehicle might reach the location of the event before the accident is removed, and the vehicle is notified only when the vehicle might reach the location before the accident is removed.

For example, if the predicted duration of the event is 20 minutes, whereas the vehicle will reach the location of the event after 30 minutes, then at this point the vehicle does not need to be notified. For another example, when it is predicted that the vehicle will reach the location of the event in 10 minutes, a notification should be sent to the vehicle.

According to some embodiments of the present invention, when it is found that the road segment to which the vehicle belongs will be influenced by a plurality of events, these events can further be sorted. Specifically, in some embodiments of the present invention, the notifying the vehicle of an event associated with a road segment in the query index includes, in response to determining that the query index contains a plurality of events associated with a road segment, sorting the plurality of events on the basis of at least one of: types of the plurality of events, distances from locations of the plurality of events to a location of the vehicle, and severity of the plurality of events. The vehicle is then notified of the plurality of the sorted events.

Events can be sorted on the basis of types of these events for example, in an order of traffic accident, congestion, and road repair. Also, the sorting can be based on a distance from the location of the event to a current location of the vehicle, for example, according to travel distance along road segments in the road network. Further, the sorting can be implemented on the basis of severity of events, for example, first a vehicle is notified about a serious traffic accident and later is notified about a slight traffic accident.

In some embodiments of the present invention, notifying the vehicle of the event associated with a road segment in the query index includes, in response to determining the query index contains a plurality of events associated with the road segment, determining a detour indicator for each event among the plurality of events. The detour indicator describes a ratio of a linear distance to a travel distance from a location of each event among the plurality of events to the location of the vehicle. The embodiment further includes sorting the plurality of events on the basis of the detour indicators and then notifying the vehicle of the plurality of sorted events.

In embodiments, the detour indicator can reflect, to some degree, the consistency between the location of the event and a direction in which the vehicle is travelling. For example, a detour indicator approximating to 1 can represent that the location of the event is in front of the travel direction of the vehicle, at which point the event could be deemed a priority. For another example, a small detour indicator can represent that the vehicle has to change direction for several times before reaching the location of the event. Therefore, it could be considered that the event is not closely related to the vehicle and notice of this event can be arranged into a lower position.

Alternatively, in embodiments, sorting a plurality of events can further be implemented on the basis of at least two of the above respects. For example, weights can be assigned with respect to type of the event, distance to the event, severity of the event, and a detour indicator, respectively, and then a final sorting is calculated.

Various embodiments implementing methods of the present invention have been described above with reference to the accompanying drawings. Those skilled in the art will understand that these embodiments can be implemented in software, hardware, or a combination of software and hardware. Moreover, those skilled in the art will understand that by implementing steps of these methods in software, hardware, or a combination of software and hardware, there can be provided an apparatus that embodies some embodiments of the present disclosure. In embodiments, even if the apparatus has the same hardware structure as a general-purpose processing device, the functionality of software contained therein can make the apparatus manifest distinguishing properties from the general-purpose processing device, thereby forming an apparatus of the various embodiments of the present invention. The apparatus described in embodiments of the present invention can include several means or modules, the means or modules can be configured to execute corresponding steps. Upon reading this specification, those skilled in the art will understand how to write a program for implementing actions performed by these means or modules. Since embodiments of the apparatus are based on the same or similar invention concept as some methods described herein, the same or corresponding implementation details can also be applicable to means or modules corresponding to these methods.

Figure 8A:
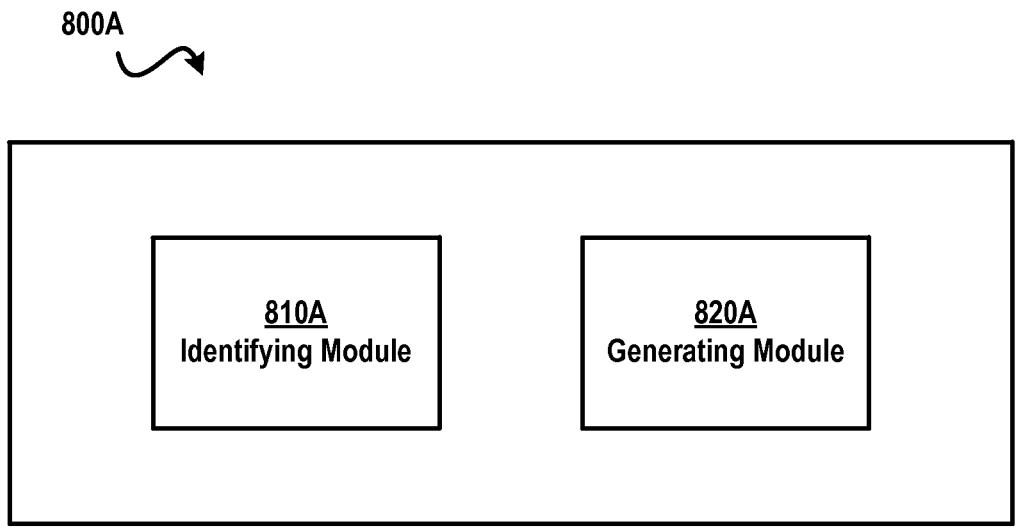
FIG. 8A schematically depicts a block diagram of an apparatus for generating a query index with respect to an event in a road network according to some embodiments of the present invention.

FIG. 8A schematically shows a block diagram 800A of an apparatus for generating a query index with respect to an event in a road network according to some embodiments of the present invention. Specifically, there is provided an apparatus for generating a query index with respect to an event in a road network. The apparatus includes an identifying module 810A configured to identify a road segment set influenced by the event on the basis of a connected network, wherein the connected network is built on the basis of reachability of a road segment in the road network, and each road segment in the road segment set is reachable via the road network from the location of the event. The apparatus further includes a generating module 820A configured to generate the query index on the basis of the event and the road segment set.

In some embodiments of the present invention, connection relationships of the connected network are set on the basis of topology of the road network, and reachability in the connected network is set on the basis of traffic information about the road network.

In some embodiments of the present invention, reachability in the connected network is represented by determining, on the basis of an allowed travel direction of a road segment, a direction of an edge in the connected network to represent the reachability.

In some embodiments of the present invention, each road segment is within a predefined influence range around the location of the event, and the apparatus further includes a range determining module configured to determine the predefined influence range on the basis of at least one of: a physical distance from the location of the event to the road segment; a travel distance from the location of the event to the road segment along road segments in the road network; the type of the event; and the severity of the event.

In some embodiments of the present invention, identifying module 810A includes a traversing module configured to identify each reachable road segment within the predefined influence range in order to form, from an edge representing a road segment to which the location of the event belongs, the road segment set.

In some embodiments of the present invention, identifying module 810A is further configured to, in response to a second predefined influence range around a location of a second event in the road network overlapping the predefined influence range, identify within an overlap range a second road segment set influenced by the second event on the basis of the connected network, wherein each road segment in the second road segment set is reachable via the road network from the location of the second event. The apparatus further includes an updating module configured to update the query index on the basis of the second event and the second road segment set.

Figure 8B:
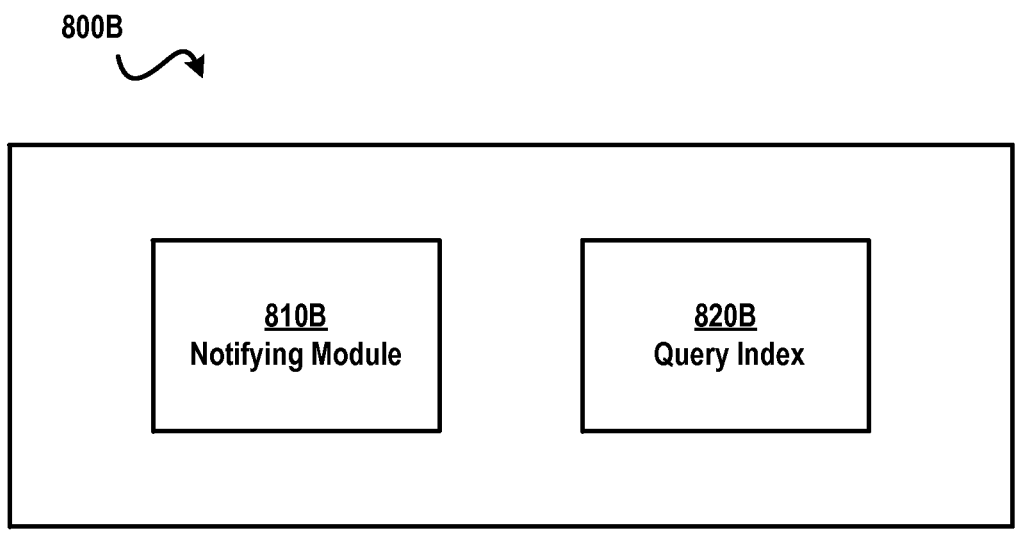
FIG. 8B schematically depicts a block diagram of an apparatus for notifying a vehicle travelling in a road network according to some embodiments of the present invention.

FIG. 8B schematically shows a block diagram 800B of an apparatus for notifying a vehicle travelling in a road network, in accordance with embodiments. Specifically, the apparatus includes a notifying module 810B configured to, in response to determining that a road segment on which the vehicle travels is any road segment in a road segment set associated with a query index 820B, notify the vehicle of an event associated with the road segment in the query index, wherein the query index is generated by a method according to embodiments of the present invention.

Some embodiments of the present invention further include a determining module configured to determine, on the basis of status information of the road network, travel time for the vehicle to reach the location of the event. In such embodiments, the notifying module is further configured to, in response to the travel time being less than predicted duration of the event, notify the vehicle of the event.

In some embodiments of the present invention, the notifying module further includes a sorting module configured to, in response to determining that the query index contains a plurality of events associated with the road segment, sort the plurality of events on the basis of at least one of: types of the plurality of events, distances from locations of the plurality of events to a location of the vehicle, and severity of the plurality of events. The embodiment further includes an events notifying module configured to notify the vehicle of the plurality of sorted events.

In some embodiments of the present invention, the notifying module further includes a calculating module configured to, in response to determining that the query index contains a plurality of events associated with the road segment, determine a detour indicator for each event among the plurality of events, the detour indicator describing a ratio of a linear distance to a travel distance from a location of each event among the plurality of events to the location of the vehicle. The notifying module further includes a sorting module configured to sort the plurality of events on the basis of the detour indicators. The notifying module further includes an events notifying module configured to notify the vehicle of the plurality of sorted events.

In embodiments of the present invention, a road segment set can be defined based on those road segments from which a location of an event is reachable (rather than being defined based on those road segments that are reachable from a location of the event). In some such embodiments, a notification module can be limited to notifying only those vehicles that can reach the event. For example, referring back to FIG. 5, a road segment set 1 associated with event 1 524={AD, DB, BD, BA, DA, EA, CA} when the road segment set is determined based on the those road segments from which the Event 1 524 is reachable. It will be noted that this change in how a road segment set is defined can change the road segments within the set. For example, road segment set 1 now includes the road segment CA because Event 1 524 is reachable from that road segment.

In embodiments, whether a particular road segment is within a road segment set is determined in part based on reachability without having to go outside of a range of the event of interest. This range may be defined based on one or more of a number of factors including, without limitation, distance of the road segment from the location of the event and travel time from the road segment to the location of the event (or vice versa). More particularly, the range of the event for road segment set determination purposes may be the same as the predefined influence range of the event. In embodiments, a road segment may not be deemed to be within a road segment set unless it is partially or completely within the predefined influence range. For example, referring again to FIG. 5, the road segments EF and FC may be excluded from the road segment set associated with event 1 524 because they are both at least partially outside of the predefined influence range 1 522.

Furthermore, in embodiments, the direction of travel of a vehicle may be used in determining whether the vehicle is to be notified of a particular event. For example, in some embodiments, it is assumed that a vehicle will not travel the other direction on a road that it is currently travelling on or any direction on a road that it has traveled on recently or within a predefined time period. For example, referring again to FIG. 5, a vehicle travelling along AE could be excluded from the notice of event 1 524 because it could be assumed that the vehicle will not switch to travel along EA (in the opposite direction).

Furthermore, in embodiments, a front node can be used in determining whether the vehicle is to be notified of a particular event. As used herein a front node may refer to the closest node toward which a vehicle is travelling. It may be the nearest intersection in the vehicle's direction of travel. It may be the nearest important intersection in the vehicle's direction of travel. A vehicle's front node can be a detail that is used in querying travel events. For example, events can be sorted based on nodes that they affect (e.g., nodes that are endpoints for (directly connected to) at least one road segment in the road segment set for the event). While the vehicle is travelling, a front node for the vehicle can be identified based on the location and direction of the vehicle. Once the front node is determined, the identity of the front node can be used to query (e.g., determine based on searching a query index) which events are of interest to the vehicle. In embodiments, a set of events that are of interest to the vehicle may be further limited based on excluding those events that are, for example, only reachable from the front node by travelling the opposite direction along which the vehicle is currently travelling or, for another example, only reachable from the front node along a road segment which the vehicle has traveled within a predetermined time before the query occurred.

An example employing embodiments described in the above paragraph is now described. In this example, referring again to FIG. 5, a vehicle is traveling along road segment BD. Based on the vehicles location and direction of travel, node B is determined to be the front node for the vehicle. Node B is then used to query a database of events and the nodes that the events affect. In this example, the query returns the event 1 524 because node B is an endpoint for at least one of the road segments included in the road segment set for event 1 524 (e.g., road segment BA). Based on the query result, the driver of the vehicle is notified of event 1 524.

According to some embodiments, the disclosure includes a system for generating a query index with respect to an event in a road network. The system includes a memory and a processor in communication with the memory. The processor is configured to load instructions from the memory that cause the processor to perform a method. As part of the method, a road segment set influenced by the event on the basis of a connected network is identified. The connected network is built on the basis of reachability of a road segment in the road network. Each road segment in the road segment set is reachable via the road network from a location of the event. As further part of the method, the query index is generated on the basis of the event and the road segment set.

According to some embodiments, the disclosure includes a computer program product for generating a query index with respect to an event in a road network. The computer program product includes a computer readable medium having program instructions embodied therewith. The program instructions are executable by a processor to cause the processor to perform a method. As part of the method, a road segment set influenced by the event on the basis of a connected network is identified. The connected network is built on the basis of reachability of a road segment in the road network. Each road segment in the road segment set is reachable via the road network from a location of the event. As further part of the method, the query index is generated on the basis of the event and the road segment set.

According to some embodiments, the disclosure includes a system for generating a query index with respect to an event in a road network. The system includes a memory and a processor in communication with the memory. The processor is configured to load instructions from the memory that cause the processor to perform a method. As part of the method, a road segment set influenced by the event on the basis of a connected network is identified. The connected network is built on the basis of reachability of a road segment in the road network. A location of the event is reachable via the road network from each road segment in the road segment set. As further part of the method, the query index is generated on the basis of the event and the road segment set.

According to some embodiments, the disclosure includes a computer program product for generating a query index with respect to an event in a road network. The computer program product includes a computer readable medium having program instructions embodied therewith. The program instructions are executable by a processor to cause the processor to perform a method. As part of the method, a road segment set influenced by the event on the basis of a connected network is identified. The connected network is built on the basis of reachability of a road segment in the road network. A location of the event is reachable via the road network from each road segment in the road segment set. As further part of the method, the query index is generated on the basis of the event and the road segment set.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for using a connected network built on the basis of reachability of a plurality of road segments in a road network, the method comprising:
   identifying an event in the connected network;
   forming a road segment set influenced by the event on the basis of the connected network by identifying each road segment in the plurality of road segments from which a location of the event is reachable via the road network from that road segment and which is within a predefined influence range from the location of the event;
   generating a query index on the basis of the event and the road segment set;
   forming a geo-fence around a perimeter of the predefined influence range such that a notification of the event is transmittable to a plurality of vehicles located within the geo-fence;
   detecting, based on GPS data about the plurality of vehicles, a location of each vehicle of the plurality of vehicles within the geo-fence;
   determining, based on the query index and the location of each vehicle of the plurality of vehicles, that each vehicle of a first vehicle set of the plurality of vehicles is on a road segment in the road segment set and that each vehicle of a second vehicle set of the plurality of vehicles is not on a road segment in the road segment set; and
   notifying, based on the determining, each vehicle of the first vehicle set of the event without notifying the vehicles of the second vehicle set of the event.

2. The method of claim 1, wherein connection relationships of the connected network are set on the basis of topology of the road network, and reachability in the connected network is set on the basis of traffic information about the road network.

3. The method of claim 2, wherein reachability of a road segment in the connected network is represented by:
   determining, on the basis of an allowed travel direction of the road segment, a direction of an edge in the connected network to represent the reachability of the road segment.

4. The method of claim 1, wherein the predefined influence range is determined on the basis of at least one item selected from a group consisting of:
   a physical distance from the location of the event to the road segment;
   a travel distance from the location of the event to the road segment along road segments in the road network;
   a type of the event; and
   a severity of the event.

5. The method of claim 1, further comprising:
   determining, based on the query index and the location of each vehicle of the plurality of vehicles, that a first vehicle of the first vehicle set is on a first road segment that is in a second road segment set influenced by a second event,
   wherein the notifying each vehicle of the first vehicle set of the event comprises:
      determining a detour indicator for each of the event and the second event, each detour indicator describing a ratio of a linear distance to a travel distance from a location of the corresponding event to a location of the first vehicle;
      sorting the event and the second event on the basis of the detour indicators; and
      notifying the first vehicle of the sorted event and second event.

6. An apparatus for using a connected network built on the basis of reachability of a plurality of road segments in a road network, the apparatus comprising:
   a memory; and
   a processor in communication with the memory, the processor configured to obtain instructions from the memory that cause the processor to perform a method comprising:
   identifying an event in the connected network;
   forming a road segment set influenced by the event on the basis of the connected network by identifying each road segment in the plurality of road segments from which a location of the event is reachable via the road network from that road segment and which is within a predefined influence range from the location of the event;
   generating a query index on the basis of the event and the road segment set;
   forming a geo-fence around a perimeter of the predefined influence range such that a notification of the event is transmittable to a plurality of vehicles located within the geo-fence;
   detecting, based on GPS data about the plurality of vehicles, a location of each vehicle of the plurality of vehicles within the geo-fence;
   determining, based on the query index and the location of each vehicle of the plurality of vehicles, that each vehicle of a first vehicle set of the plurality of vehicles is on a road segment in the road segment set and that each vehicle of a second vehicle set of the plurality of vehicles is not on a road segment in the road segment set; and notifying, based on the determining, each vehicle of the first vehicle set of the event without notifying the vehicles of the second vehicle set of the event.

7. The apparatus of claim 6, wherein connection relationships of the connected network are set on the basis of topology of the road network, and reachability in the connected network is set on the basis of traffic information about the road network.

8. The apparatus of claim 7, wherein reachability of a road segment in the connected network is represented by:
determining, on the basis of an allowed travel direction of the road segment, a direction of an edge in the connected network to represent the reachability of the road segment.

9. The apparatus of claim 6, wherein the apparatus further comprises: a range determining module configured to determine the predefined influence range on the basis of at least one item selected from a group consisting of:
a physical distance from the location of the event to the road segment;
a travel distance from the location of the event to the road segment along road segments in the road network;
a type of the event; and
a severity of the event.

10. The apparatus of claim 6, wherein the method further comprises:
determining, based on the query index and the location of each vehicle of the plurality of vehicles, that a first vehicle of the first vehicle set is on a first road segment that is in a second road segment set influenced by a second event, wherein the notifying each vehicle of the first vehicle set of the event comprises:
determining a detour indicator for each of the event and the second event, each detour indicator describing a ratio of a linear distance to a travel distance from a location of the corresponding event to a location of the first vehicle;
sorting the event and the second event on the basis of the detour indicators; and
notifying the first vehicle of the sorted event and second event.

11. A method for generating a query index with respect to an event in a road network, comprising:
identifying a road segment set influenced by the event on the basis of a connected network, wherein the connected network is built on the basis of reachability of a road segment in the road network, and a location of the event is reachable via the road network from each road segment in the road segment set;
generating the query index on the basis of the event and the road segment set;
identifying, based on GPS data, a vehicle location;
identifying, based on vehicle travel direction and the vehicle location, a front node for a vehicle travelling on a road segment;
searching, using the identified front node, within the query index;
determining, based on the searching, that at least one road segment directly connected to the front node is a road segment of the road segment set; and
notifying, in response to the determination that at least one road segment directly connected to the front node is a road segment of the road segment set, the vehicle of the event.

* * * * *